United States Patent [19]

Kleine et al.

[11] Patent Number: 4,880,885

[45] Date of Patent: Nov. 14, 1989

[54] POLYMERIZATION REACTOR PROVIDED WITH COATING THAT SUPPRESSES POLYMER DEPOSIT FORMATION

[75] Inventors: Willi Kleine, Burghausen; Werner Frey, Bergisch-Gladbach; Albrecht Däweritz, Bad Aibling, all of Fed. Rep. of Germany

[73] Assignee: Wacker-Chemie GmbH, Fed. Rep. of Germany

[21] Appl. No.: 182,170

[22] Filed: Apr. 15, 1988

Related U.S. Application Data

[60] Continuation of Ser. No. 829,396, Feb. 13, 1986, abandoned, which is a division of Ser. No. 700,627, Feb. 12, 1985, Pat. No. 4,661,569.

[30] Foreign Application Priority Data

Feb. 15, 1984 [DE] Fed. Rep. of Germany ....... 3405436

[51] Int. Cl.$^4$ ............................................. C08G 59/06
[52] U.S. Cl. ........................................ 526/62; 526/74; 428/413; 428/418; 427/230; 427/386; 422/131
[58] Field of Search ...................... 526/62, 74; 428/35, 428/413, 418; 427/230, 386; 422/131

[56] References Cited

U.S. PATENT DOCUMENTS 2,057,674 10/1936 Fields ................................ 526/63 X
4,299,747 11/1981 Birkmeyer ...................... 528/114 X

OTHER PUBLICATIONS

S. S. Stivala, Epoxy Resins, Polymer Processes, C. E. Shildknecht (ed.) Interscience Publishers, N.Y., 429–35, 1956.

*Primary Examiner*—Joseph L. Schofer
*Assistant Examiner*—F. M. Teskin
*Attorney, Agent, or Firm*—Bierman and Muserlian

[57] ABSTRACT

In a process of polymerizing ethylenically unsaturated compounds by polymerization of ethylenically unsaturated monomers in the presence of a free radical-forming initiator system and customary protective colloids and/or emulsifiers and optional known additives in a reactor whose surfaces contact the reaction components, the improvement comprising providing the reactor surfaces with a coating that at least suppresses polymer deposit formation without effecting the color and quality of the polymer.

2 Claims, No Drawings

POLYMERIZATION REACTOR PROVIDED WITH COATING THAT SUPPRESSES POLYMER DEPOSIT FORMATION

PRIOR APPLICATION

This appliction is a continuation of copending U.S. patent application Ser. No. 829,396 filed Feb. 13, 1986, now abandoned, which is a division of U.S. patent application Ser. No. 700,627 filed Feb. 12, 1985, now U.S. Pat. No. 4,661,569.

STATE OF THE ART

In the manufacture of polymers of ethylenically unsaturated monomers, especially vinyl chloride alone or with at least one other ethylenically unsaturated compound polymerizable therewith, preferably in an aqueous medium with a free radical-forming initiation system in the presence of a protective colloid and/or emulsifiers and optional customary additives, polymer deposits form on the surface of the polymerization reactor during the polymerization. The deposit forms on the reaction vessel and the optional equipment present therein which contact the components of the reaction mixture.

The deposited polymers can not be further processed and constitute waste material which are a hazard to the environment in the case of vinyl chloride polymers due to the high amounts of residual monomer content in most instances.

Moreover, part of the deposits often become detached from the said surfaces even during polymerization and adversely affect the quality of the desired polymer product since they give rise to pin-holes or "fish eyes" therein. Finally, such crusts impede the dissipation of the heat of polymerization through the reactor walls which entails longer reaction times, uncontrolled progress of the reaction and risk to the operational reliability.

The removal of such wall deposits and crusts is therefore necessary and this is usually effected by mechanical means, for example by spraying the emptied reaction vessel or autoclave with high pressure water such as greater than 100 bars. In so doing, however, the wall deposits which usually adhere firmly generally do not become completely detached, and the remaining portions caused an increased formation of such crusts in subsequent polymerizations. For that reason, the reactor has to be opened after only a few batches and mechanically cleaned by hand while observing complicated safety precautions. Apart from the prolonged shut-down periods resulting therefrom and the risk to the environment, especially to the maintenance staff, for example from vinyl chloride residues, it is not possible to avoid damaging the vessel walls and the surfaces of the equipment in such cleaning operations using a spatula. Again such rough areas also form a starting point for an increased formation of crusts.

For a long time, therefore, attempts have been made to find possible ways of solving these problems by reducing or preventing the formation of polymer crusts during polymerization. For example, proposals have been made for the autoclave dome to be sprayed with water during polymerization, or for suitable water-soluble substances such as nitrites to be added to the polymerization liquor. However, these processes are not entirely satisfactory and also give rise to problems with liquid waste, for example.

The other course most often followed in the meantime is coating of the inner walls of the reaction apparatus with largely insoluble coverings of organic compounds that contain polar groups such as dyestuffs such as nigrosine black, Sudan black B inter alia (cf., for example, British Pat. No. 1,562,290), polycondensates such as polyimines, polyamines and polyphenols which in some cases have been cross-linked with an aldehyde (cf., for example, WO-A-82/02555, U.S. Pat. No. 3,055,876).

The known coatings did not meet all the requirements, either because they dissolved and became detached too readily, causing discoloration of the product, or because their action was still unsatisfactory. Nor are they yet universally applicable or also still exhibit undesired retarding action on polymerization and changes in the polymers such as coarsening of the grain, reduction of the thermal loading capacity or stability also appeared.

To avoid these difficulties, U.S. Pat. No. 4,143,097 and No. 4,256,854 have already proposed coatings based on certain derivatives of benzthiazol-2-one-hydrazone which may optionally be fixed to the walls by certain carrier materials. In this connection, it is also proposed that cross-linking materials such as shellac or alkyd resins based on an isocyanate or phenol-aldehyde, and also based on an epoxide or anhydride basis be used for fixing the active ingredients. However, it is important for the active ingredient preferably not to be bonded chemically and especially not by way of the hydrazone group which is essential therein, since otherwise the desired deposit-suppressing action does not appear. For that reason, it is also recommended in these patents that a hardener having a higher cross-linking activity than the active ingredient be added to the epoxide or anhydride system.

Apart from the fact that the active deposit-suppressing portion of the active ingredient is suspended only physically in the deposit and, therefore, is relatively easily washed out, especially when emulsifiers are used, the ratio of the mixture of epoxide prepolymer/hardener/active ingredient has to be adhered to very strictly when manufacturing the coatings and due to the very short pot-time, the reactive coating agent can be stored only for a limited period.

OBJECTS OF THE INVENTION

It is an object of the invention to provide a novel polymerization process that is simple and reliable, that exhibits a good to very good activity against the formation of polymer deposits, that even in the uncross-linked state possesses good resistance to being washed out and, in the cross-linked state, even where polymerization mixtures having a high content of emulsifiers are involved, possesses a resistance better than that in the prior art, and that avoids the disadvantages of the prior art which have been discussed above.

These and other objects and advantages of the invention will become obvious from the following detailed description.

THE INVENTION

In the novel process of the invention of polymerizing ethylenically unsaturated compounds by polymerization of ethylenically unsaturated monomers in the presence of a free radical-forming initiator system and customary protective colloids and/or emulsifiers and optional known additives in a reactor whose surfaces contact the reaction components, the improvement comprises providing the reactor surfaces with a coating that at least suppresses polymer deposit formation, the coating being comprised of at least one compound of the formula

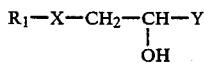   I optionally subjected to a cross linking reaction wherein X is selected from the group consisting of —O—, —S—, and

Y is selected from the group consisting of —CH$_2$OR$_6$,

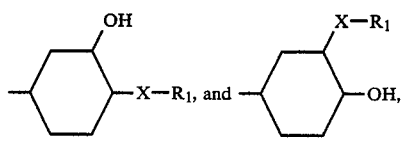

$R_1$ is selected from the group consisting of $R_2$—,

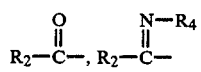

and $R_2$—SO$_2$—, $R_2$ is selected from the group consisting of phenyl and naphthyl optionally substituted with at least one $R_3$ and heterocycle optionally substituted with at least one $R_3$ and derived by substitution of nitrogen, sulfur and/or oxygen atoms for at least one carbon of benzene, cyclopentadiene, indene, naphthalene or their partially or completely hydrogenated analogs, alkyl of 1 to 8 carbon atoms containing at least one $R_3$,

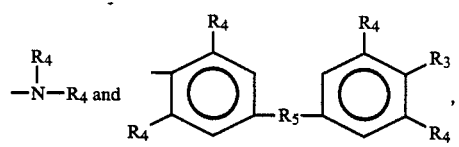

$R_3$ is selected from the group consisting of —OH, —SH,

—COOH and —SO$_3$H, the $R_4$'s being independently selected from the group consisting of hydrogen and alkyl of 1 to 4 carbon atoms, $R_5$ is selected from the group consisting of

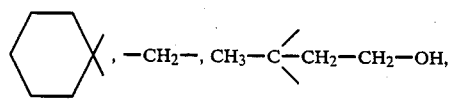

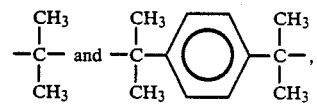

$R_6$ is selected from the group consisting of

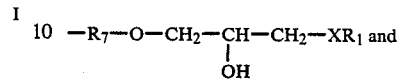

and $R_7$ is selected from the group consisting of alkylene of 1 to 8 carbon atoms optionally substituted with at least one alkyl of 1 to 4 carbon atoms, phenylene and naphthylene having at least one $R_3$ and/or $R_4$ and

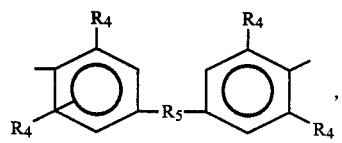

The preferred compounds to be used in the coating of the reactor have the formula

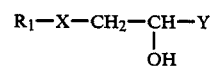   I which can also be subjected to a cross-linking reaction wherein X is —O— or —NH—, Y is —CH$_2$OR$_6$, $R_6$ is

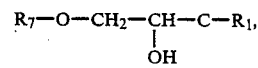

$R_7$ is phenylene or naphthylene optionally carrying at least one $R_3$ and/or $R_4$ and alkylene of 1 to 4 carbon atoms or

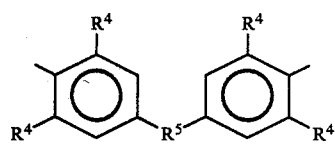

The coating of the surfaces is preferably effected by applying the compound of formula I or a mixture of such compounds in the form of a solution or dispersion in polar solvents that are preferably free of amino, imino, amido or imido functional groups and that boil preferably at not more than 120°, especially at not more than 100° C., preferably at room temperature for example approximately between 10° and 30° C. and, optionally, subsequently heating it to remove the solvent, for preferably 30-120 minutes at preferably 40-120, more preferably 40°-100° C. The said solutions or dispersions each comprise preferably from 1 to 10% by weight of at least one compound of formula I. It has also been found advantageous in many cases to adjust the pH of the solution of the compound(s) of formula I to values of from 7 to 12, preferably from 9 to 12, optionally by the addition of alkali metal or alkaline earth metal hydroxide, for example sodium, calcium and potassium hydroxide solution.

There may be mentioned as especially suitable solvents propanone and butan-2-one, butanol, n-propanol and isopropanol and especially ethanol and methanol, each of which may optionally be mixed with up to approximately the same amount of water.

In a preferred embodiment, a mixture of at least one compound of formula I and at least one compound of the formula

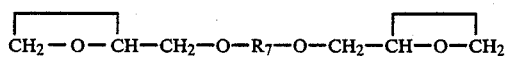
II wherein $R_7$ has the above definition in a molar ratio of from 10:1 to 1:1, preferably from 8:1 to 2:1, is applied to the surfaces to be coated, preferably according to the above measures and conditions, and dried preferably at the temperatures given above and, in so doing, simultaneously cross-linking thereon.

The process of the invention can be applied to a large number of monomers that are polymerized according to a suspension, emulsion or micro-suspension process in an aqueous medium or by mass-polymerization. Examples of such monomers are styrenes, acrylates and methacrylates, vinyl esters, vinyl halides and vinylidene halides and mixtures thereof.

The process of the invention is especially suitable, and therefore preferred, for homo-, co- and graft polymerization of vinyl chloride (VC). Further examples of suitable monomers and, provided they are copolymerizable with one another and/or with VC, comonomers are vinyl esters of carboxylic acids of the formula RCOOH wherein R is hydrogen or straight-chain or branched alkyl of 1 to 20 carbon atoms, for example vinyl formate, n-butyrate, sec-butyrate, tert-butyrate or laurate or stearate or versatate (=vinyl esters of Versatic ® acids, carboxylic acids manufactured by Koch's synthesis, cf. Rompps Chemie-Lexikon, 7th edition, 1977, page 3803), preferably vinyl acetate and vinyl propionate; alkyl ester of 1 to 18 carbon atoms of $\alpha,\beta$-unsaturated carboxylic acids having 3 to 6 carbon atoms in the acyl radical, for example methyl, ethyl, n-propyl, isopropyl, n-butyl, sec-butyl, tert-butyl crotonate or itaconate and preferably methacrylate and especially acrylate; styrene; vinyl-toluene; vinyl fluoride and bromide; vinylidene halides such as vinylidene chloride and bromide; $\alpha$-olefins, such as propylene and preferably ethylene; maleic and fumaric acid mono- and/or di-esters with saturated alcohols of 1 to 18 carbon atoms; vinyl ethers; (meth)-acrylonitrile; (meth)acrylamide; vinylsulfonic acid, and salts thereof; acrylic acid, methacrylic acid, maleic acid, fumaric acid, maleic anhydride and mixtures of such compounds, the water-soluble strongly polar monomers being used mostly in small amounts for stabilizing the dispersion.

Suitable polymerization processes that can be modified by the invention are known, for example, from the following printed specifications: EP-A-No. 590, No. 8775, No. 14 420, No. 17 986, No. 28 812, N. 32 724, No. 62 106, No. 76 511 and No. 78 043 and DE-A-No. 2,206,593, No. 2,234,038, No. 2,629,880, No. 3,215,624 and No. 3,312,255.

Especially preferred is the manufacture of VC-homopolymers and VC-copolymers having up to 40% by weight, based on the total weight, of the comonomer units mentioned.

With regard to the initiator system which may consist of oil-soluble or water-soluble peroxidic compounds optionally combined with reducing agents, and with regard to the protective colloids, emulsifiers and further customary additives, reference is made for the purposes of condensing the description to the printed specifications mentioned above and also, for example, to D'Alelio, Fundamental Principles of Polymerization, New York/London, 1952 and Houben-Weyl, Methoden der organischen Chemie, 4th edition, 1961 volume 14/1.

The compounds of formula I can be manufactured from diglycidyl ethers of formula II, by reaction with benzene or naphthalene derivatives having at least two substituents selected from hydroxy, thiol, amino, sulfoxyl and/or carboxyl groups ($R_3$) with a heterocycle that is derived preferably from benzene by substitution of one or two, especially one, ring carbon atom(s), preferably by nitrogen, and that is subsituted by at least one of the mentioned groups $R_3$, with straight-chain or branched alkyl of 1 to 8, preferably 1 to 4, carbon atoms that is substituted by at least two of the mentioned groups $R_3$, with guanidine or with

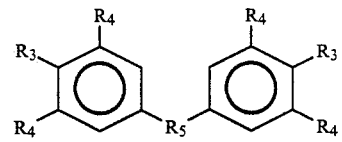

wherein each $R_3$ and $R_4$ independently have the meanings given above.

Preferably, the $R_3$ amino groups are substituted by not more than one alkyl and, more especially, by no alkyl.

As suitable compounds that may be designated by $R_1$–$R_3$ and from which the compounds of formula I can be manufactured by reaction with the diglycidyl ethers or with vinylcyclohexane dioxide, there may be mentioned, for example: dihydroxybenzenes such as resorcinol, hydroquinone, pyrocatechol; amino-hydroxybenzenes such as 2-, 3- and especially 4-aminophenol; thiohydroxybenzenes such as monothiopyrocatechol, monothioresorcinol, monothiohydroquinone; hydroxybenzoic acids such as salicylic acid, 3- and 4-hydroxybenzoic acid; amino-benzoic acids such as anthranilic acid, 3- and 4-aminobenzoic acid; aminohydroxybenzoic acids such as 3- and 4-aminosalicyclic acid, 2- and 4-amino-3-hydroxy-benzoic acids, 2- and 3-amino-4-hydroxybenzoic acids; dihydroxybenzoic acid; pyrogallol; aminophenylsulfonic acid; aminoaphthenes, naphthalene diamines; $\alpha$- and $\beta$-naphtholyquinone and other dihydroxy-naphthalenes; aminonaphthoic acids. There may also be mentioned hydroxypyridines; aminopyridines, dihydroxy-pyridines; hydroxy-aminopyridine; picolinic acid, nicotinic acid, isonicotinic acid, citrazinic acid, amino- and hydroxy-pyridinic acids; aminopyrimidine; aminodihydroxypyrimidines; citric acid; ethylenediamine; guanidine; diaminobutane; bisphenol A. The substituted benzenes are especially preferred as starting material.

The compounds $R_1$–$R_3$ that have more than two positions capable of reaction with epoxide groups are preferred if the coating is to be cross-linked as in the preferred embodiment described above. There may be mentioned especially compounds having at least one amino group optionally in addition to other radicals $R_3$ and their use is therefore also especially preferred.

In the manufacture of the compounds of formula I, the compounds $R_1$–$R_3$ are used with the epoxy compounds preferably in excess, for example in a molar ratio of approximately from 2:1 to 3:1 so that preferably all the epoxy groups react completely, but it is quite possible for a smaller proportion of compounds of formula I that still contain epoxy groups to be present, especially if in the compound of formula I, X is NH or at least part of $R_3$ is $NH_2$.

The compounds of the formula I and optionally of formula II used in the invention may, as already explained, be applied preferably as a solution to the surfaces which will come into contact with the monomers and which have previously been thoroughly cleaned. Optionally, this treatment may be repeated several times after suitable intermediate drying and possible heating. Normally, however, a single coating is sufficient since the compounds are distinguished by the ability to adhere well. This treatment is carried out in accordance with the customary processes, for example, by rinsing, spreading or spraying on, or by briefly flooding the container or the like, preferably by spraying or spreading on, usually prior to each polymerization batch. Preferably, the treated surfaces are then additionally briefly rinsed off with water or polymerization liquor prior to polymerization with the waste liquid being removed.

If the coating of the preferred embodiment is cross-linked, the subsequent treatment of the container with fresh coating solution/dispersion after every polymerization batch is unnecessary. Rather, it is generally then sufficient to remove loose polymer residue from the container by rinsing briefly with water. It has proved to be an advantage to check the container from time to time for damage to the coating, and optionally, for example after 20 to 70 reaction cycles, to provide a new coating as a precaution. To prepare the coating, it has proved advantageous to remove polymer residues and other contaminants from the container. For this purpose, there may be mentioned by way of example: mechanical cleaning, treatment with solvents, acids, oxidizing agents and similar substances.

As the effectiveness of the solution or dispersion of the compounds of formula I is not impaired by atmospheric oxygen, no particular attention need be paid to excluding air provided that this is not preferred for other reasons, for example to make rinsing with inert gas before initiating polymerization unnecessary.

There are no special requirements as to the surface condition of the polymerization apparatus, although an undamaged, smooth surface is usually preferred. The apparatus may be made or different materials, for example glass, enamel or vitreous ware, or metal, especially steel. The term "surface" is not restricted to the container wall, but refers also to other surfaces coming into contact with constituents of the reaction mixture, for example pipelines, pressure equalizing vessels, valves, baffles, sensors, external reflux condensers, internal condensers, container nozzles and other equipment.

Polymerization itself may, as already explained, be carried out by the customary procedures of mass, suspension, emulsion or micro-suspension processes, discontinuously or also optionally continuously, with or without the use of seeding preparations, with the customary initiator systems, protective colloids, emulsifiers and other polymerization auxiliaries, optionally under reflux cooling in partially or completely filled reaction containers (autoclaves), unpressurized, below, at or above the autogeneous pressure of the monomers, for example with concomitant use of ethylene up to, for example, 100 bars or above, with all or individual constituents of the reaction mixture being present or with part of, or individual constituents of, the reaction mixture being present and part being metered in subsequently, or none of the constituents being present initially and the constituents being added according to the metering-in process.

Although it is normally superfluous, addition to the polymerization mixture of a small amount of wall-deposit inhibitor such as citric acid or tartaric acid is naturally not excluded. It is, of course, also possible to add dyestuffs which have already been used for this purpose provided that coloration of the product is acceptable.

The polymers can be worked up in the customary manner; for example, the resulting suspensions, dispersions or latices or polymers can be degassed, filtered, coagulated, dried or stabilized in the customary manner.

It was established that the coating used in the invention, particularly after cross-linking, has virtually no further tendency to dissolve or become detached so that residues thereof are virtually no longer detectable either in the product or in the waste liquid.

The following Examples are intended to explain the present invention in greater detail. They are preferred embodiments of the invention without limiting it strictly. The yields (% of the theoretical value) refer in each case to the diglycidyl ether used.

EXAMPLE 1

30.4 g (0.22 mole) of 4-hydroxybenzoic acid and 1.0 g of triethylamine in 350 ml of dioxane were introduced into a three-necked flask equipped with a stirrer, a reflux condenser and a dropping funnel and the mixture was heated to reflux. While stirring, 34.0 g (0.1 mol) of bisphenol-A-diglycidyl ether (BD) dissolved in 200 ml of dioxane were then slowly added dropwise. After completion of the addition, the reaction mixture was maintained at reflux until reaction was complete and then the solvent was removed by distillation. The reaction product was dried under a high vacuum to obtain a yield of 95.6%.

EXAMPLE 2

30.2 g (0.22 mol) of 4-aminobenzoic acid in 400 ml of ethanol were introduced into the same apparatus as in Example 1 and while stirring, a solution of 34.0 g of BD (0.1 mole) in 600 ml of ethanol was added dropwise. After completion of the addition, the mixture was heated at reflux for a further hour and the solvent was then substantially distilled off. Water was added to the residue and the mixture was acidified and extracted with diethyl ether. The ether was distilled off and the product was dried under a high vacuum to obtain a yield of 95%.

EXAMPLE 3

Analogously to Example 2, 22.0 g of resorcinol (0.22 mole) in the form of its monosodium salt were reacted with 34.0 g (0.1 mole) of BD in a total of 600 ml of ethanol. After refluxing for three hours, the product was worked up as described in Example 2 to obtain a yield of 57%.

EXAMPLE 4

Using the procedure of Example 2, 48.0 g (0.44 mole) of 4-aminophenol in 1000 ml of ethanol were reacted with 68.0 g of BD (0.2 mole) in 500 ml of ethanol. After reflux for five hours, the solvent was distilled off and the product was dried under a high vacuum to obtain a yield of 97%.

EXAMPLE 5

Using the procedure of Example 4, 10.4 g of 4-aminopyridine (0.11 mole) and 17.0 g of BD (0.05 mole) were reacted in a total of 350 ml of ethanol to obtain a yield of 78%.

EXAMPLE 6

Using the procedure of Example 4, 33.9 g (0.22 mole) of 4-aminosalicylic acid and 34.0 g of BD (0.1 mole) were reacted in a total of 750 ml of ethanol to obtain a yield of 98%.

EXAMPLE 7

20.8 g (0.11 mole) of 2-aminophenol-4-sulfonic acid in 200 ml of ethanol were introduced into a reaction vessel of Example 1, and the pH was adjusted to a pH of 8.5 with 2N aqueous NaOH. After heating to reflux, a solution of 17.0 g of BD (0.05 mole) in 150 ml of ethanol was slowly added dropwise. After the addition had ended, the reaction mixture was refluxed for a further 8 hours and then was concentrated to about 20% by distilling off the solvent. The residue was diluted with water and acidified. The precipitated product was filtered off and dried under a high vacuum to obtain a yield of 62.5%.

EXAMPLE 8

12.1 g (0.11 mole) of 2-amino-3-hydroxypyridine in 250 ml of ethanol were introduced into the same apparatus of Example 1 and while stirring, a solution of 17.0 g of BD (0.05 mole) in 150 ml of ethanol was added dropwise. After completion of the addition, the mixture was refluxed for a further 5 hours, and thereafter freed of solvent. Finally, the product was dried under a high vacuum to obtain a yield of 95%.

EXAMPLE 9

Using the procedure of Example 8, 36.0 g of 4-aminophenol (0.33 mole) were reacted with 30.3 g of butanediol diglycidyl ether (0.15 mole) in a total of 900 ml of ethanol to obtain a yield of 92%.

EXAMPLE 10

Using the procedure of Example 8, 24.0 g of 4-aminophenol (0.22 mole) in 500 ml of toluene and 300 ml of ethanol, and 22.2 g of hydroquinone diglycidyl ether (0.1 mole), which was added dropwise as a solution in 250 ml of toluene, were reacted to obtain a yield of 95%.

EXAMPLE 11

15.03 g of ethylene diamine (0.25 mole) dissolved in 250 ml of ethanol were introduced into a three-necked flask equipped as in Example 1 and a solution of 34.0 g of BD (0.1 mole) in 300 ml of ethanol was slowly added thereto at 35° C. After completion of the addition, ethanol and excess ethylene diamine were distilled off and the reaction product was dried under a high vacuum to obtain a yield of 94%.

EXAMPLE 12

Example 1 was repeated except that 42.2 g (0.22 mole) of citric acid and 1.0 g of triethylamine in 300 ml of dioxane were introduced and 34.0 g of BD (0.1 mole) in 250 ml of dioxane were added dropwise to obtain a yield of 57%.

The following Examples demonstrate the surprising advantages of the present invention. Examples 13 to 24, 30 to 32 and Comparison Experiments A, B, D and E were carried out in a 1 liter steel autoclave following the scheme given below:

(a) Filling the autoclave with tetrahydrofuran (THF), stirring the THF at 60° C. for 16 hours, then discharging the contents by which the absolute freedom of the vessel from polymer deposits was guaranteed.

(b) Rinsing with acetone.

(c) Cleaning the autoclave with an abrasive agent to ensure that the walls were free of any residues of earlier coatings.

(d) Rinsing with de-ionized water.

(e) Drying the autoclave at 60° C.

(f) Coating the autoclave and the equipment as given in the individual Examples at room temperature.

(g) Charging the autoclave with a reaction mixture consisting of 200 parts by weight of de-ionized water, 100 parts by weight of vinyl chloride, 0.16 parts by weight of polyvinyl alcohol having a viscosity of 5 mPas (measured according to Hoppler in a 4% by weight aqueous solution at 20° C.) and a saponification number of 270 mg KOH/g polyvinyl alcohol), 0.3 parts by weight of dilauroyl peroxide and 0.1 parts by weight of dicetyl peroxydicarbonate.

(h) Polymerization at 59° C. while stirring at 400 rpm until a drop in pressure of approximately 1.5 bars was observed. After discharging the product, the autoclave was merely rinsed out with unpressurized water. In this manner, four polymerization cycles in each case were carried out without intermediate mechanical or chemical cleaning.

(i) After discharging the fourth batch and spraying out with unpressurized water, the autoclave was treated again as described under (a) with THF. The discharged THF was transferred to a weighed flask and distilled off. The wall deposit was produced in the flask as a residue and was determined by weighing out. To test the strength of adhesion of wall deposits, in each case, where specified, also after the fourth batch, some deposit was scratched off mechanically but not removed from the autoclave separately.

Comparison Experiment A

The autoclave was not coated. After polymerization, severe wall deposits were found even after the first batch. After the fourth batch, the crusts had caked on so firmly that they could be removed mechanically using a spatula only with difficulty. Altogether 10.20 parts by weight were detached.

EXAMPLE 13

The reactor was coated with a 2% by weight solution of the product of Example 2 in ethanol which had been adjusted to a pH of 9.5 with 2N sodium hydroxide solution. The coating was repeated after each batch and after the fourth batch, the reactor merely showed a light deposit at the transition region between the liquid phase and gas space, that is, in the region that becomes exposed by the contraction in volume, or is only at times covered by the liquid phase. The minimal deposit could very easily be removed with the finger nail and the total wall deposit was only 0.70 parts by weight.

EXAMPLE 14

Example 13 was repeated except that the coating solution was adjusted to pH 11.0. The entire wall deposit amounted to only 0.13 parts by weight and was therefore scarcely noticeable.

EXAMPLE 15

The reactor was coated before each batch with a 2% by weight solution of the product of Example 3 in methanol which had been adjusted to a pH of 11.5 with 2N sodium hydroxide solution. The entire wall deposit amounted to only 0.11 parts by weight and was therefore scarcely noticeable.

EXAMPLE 16

The reactor was coated before each batch with a 2% by weight methanolic solution of the product of Example 4 which which had been adjusted to a pH of 12.0 with 2N sodium hydroxide solution. Only at the phase boundary of the gas space to the liquid phase did a total of 0.10 parts by weight of polymer, easily removable using a finger, become deposited.

EXAMPLE 17

The autoclave was coated before each batch with a 2% by weight methanolic solution of the product of Example 11 which had been adjusted to a pH of 11.5 with concentrated sodium hydroxide solution. A total of 0.30 parts by weight of loosely adhering polymer was detached from the phase boundary.

EXAMPLE 18

The autoclave was coated before each batch with a 4.5% by weight solution of the product of Example 12 in methanol with a pH of 4.0. Again, a total of only 0.10 parts by weight was detached.

EXAMPLE 19

The autoclave was coated before each batch with a 5% by weight methanolic solution of the product of Example 1 which had been adjusted to a pH of 12 with 1N sodium hydroxide solution. Altogether, 0.8 parts by weight of wall deposit which was very easy to remove, was dissolved off.

EXAMPLE 20

The autoclave was coated before each batch with a 2% by weight ethanolic solution of the product of Example 11 which had been adjusted to a pH of 12 with 2N sodium hydroxide solution. After the fourth batch, an easily removable deposit of 0.6 parts by weight had settled only in the region of the phase boundary.

EXAMPLE 21

Example 16 was repeated with the product of Example 9 and the weight of the loose deposit amounted altogether to 0.75 parts by weight.

EXAMPLE 22

Example 16 was repeated with the product of Example 10 and the loose deposit weighed a total of 0.86 parts by weight.

EXAMPLE 23

From the product of Example 4 and bisphenol-A-diglycidyl ether (BD), a 5% by weight solution (molar ratio of the component from Example 4: BD=8:2) was prepared and adjusted to a pH of 12 with 2N sodium hydroxide solution. Using this solution, the reactor was coated and then heated for one hour at 60° C. After the fourth batch, without the coating being renewed in between times, the reactor contained a total of 0.45 parts by weight of loosely adhering deposit only at the phase boundary.

EXAMPLE 24

From the products of Examples 3 and 11 and bisphenol-A-diglycidyl ether, a 5% by weight methanolic solution in the molar ratio 8:8:2 of the three components was prepared and it was adjusted to a pH of 11 with 2N sodium hydroxide solution. After being coated with this solution, the reactor was heated for 90 minutes at 90° C. After four batches without the coating being renewed in between times, the reactor contained a total of 0.59 parts by weight of loosely adhering deposit only at the phase boundary.

Comparison Experiment B

In accordance with the general procedure described before Example 13, a copolymer of vinyl chloride and vinyl acetate was prepared in the un-coated autoclave using 200 parts by weight of de-ionized water, 0.6 parts by weight of polyvinyl alcohol of a Hoppler viscosity of 25 mPas (a 4% by weight aqueous solution at 20° C.) and saponification number 190, 0.6 parts by weight of dilauroyl peroxide, 0.1 parts by weight of dicetyl peroxydicarbonate, 1.0 parts by weight of trichloroethylene (regulator), 85 parts by weight of vinyl chloride and 15 parts by weight of vinyl acetate.

The autoclave was so encrusted even after one batch that a second batch could not be polymerized. The very firmly adhering wall deposit was dissolved off with THF and its weight even after this one batch was 14.3 parts by weight.

EXAMPLE 25

With the product of Example 4 and bisphenol-A-diglycidyl ether, a 6% by weight methanolic solution in the molar ratio of 7:3 was prepared and adjusted to a pH 10.5 with sodium hydroxide solution. The autoclave was coated with this solution and then heated for 1 hour at 90° C.

In accordance with the procedure described before Example 13, a copolymer of vinyl chloride and vinyl acetate was prepared using the components of Comparison Experiment B. Without an interim new coating, four batches were polymerized and the deposit, which did not adhere firmly, weighed a total of 6.90 parts by weight.

The fact that the color and quality of the polymer products was not impaired in any way should be noted for all those Examples describing polymerization reactions.

EXAMPLE 26

With the product of Example 4 and bisphenol-A-diglycidyl ether, a 5% by weight ethanolic solution in the molar ratio of 8:2 was prepared and adjusted to a pH of 12 with sodium hydroxide solution. The thoroughly cleaned and completely residue-free inner surfaces and equipment of a 25 m³ steel autoclave were coated with this solution and heated for 90 minutes at 95° C.

The reactor was then charged in a customary manner with 167 parts by weight of de-ionized water, 100 parts by weight of vinyl chloride, 0.15 parts by weight of the polyvinyl alcohol used in Examples 13 to 24 and 0.07 parts by weight of dimyristyl peroxydicarbonate, and with stirring the contents were heated to 56° C. and polymerized. After a drop in pressure of 1 bar, the product was discharged and worked up. The autoclave was rinsed out with fresh water without being opened and charged again immediately as above.

After 62 such reaction cycles without being opened in between times or being additionally cleaned, the autoclave was opened. Only in the transition region at the phase boundary and at a few points of the autoclave dome was a slight, not very firmly adhering wall deposit found. However, it was possible to easily remove this without leaving residues using a high-pressure water jet of about 200 bars.

Comparison Experiment C

A 16 liter stirrer reactor equipped with an anchor mixer and baffle from which polymer had been cleaned completely was used for the preparation of polyvinyl acetate using the following reactants: 100 parts by weight of vinyl acetate, 6 parts by weight of polyvinyl alcohol having a Höppler viscosity of 25 mPas (a 4% by weight aqueous solution at 20° C.) and saponification number of 140, 0.07 parts by weight of hydrogen peroxide as a 20% aqueous solution and 70 parts by weight of de-ionized water.

After introducing the water, the polyvinyl alcohol, the $H_2O_2$ and 30 parts of vinyl acetate, the reactor with its contents was heated to 75° C. with stirring and maintained at this temperature. The remaining monomer was metered in uniformly over 8 hours. Once metering-in had finished, the temperature was increased to 90° C., and polymerization of the batch was completed at this temperature over a period of 2 hours. The residual monomer was then distilled off and the reactor was cooled at 20° C. and emptied.

After rinsing the reactor, a firmly adhering encrustation remained on the wall, stirrer and equipment which could be removed mechanically only with difficulty. Further polymerization could not be carried out without thorough cleaning in between batches. The wall deposit was 5 parts by weight.

EXAMPLE 27

With the product of Example 4 and bisphenol-A-diglycidyl ether, a 5% by weight ethanolic solution in the molar ratio of 6:4 was prepared and adjusted to a pH of 12 with sodium hydroxide solution. The thoroughly cleaned, completely polymer-free inner surfaces, stirrer and equipment of the reactor from Comparison Experiment C were coated with the solution and heated for 120 minutes at 90° C.

Then, as described in Comparison Experiment C, ten polymerizations were carried out wherein the reactor was rinsed out in between batches with water only (25 bars pressure). After ten reaction cycles, the reactor wall was completely free from encrustations and only on the stirrer and on the equipment was an easily removable wall deposit detected. The wall deposit after 10 cycles was 2 parts by weight.

Comparison Experiment D

Using the general procedure described before Comparison Experiment A, polystyrene was prepared in the un-coated autoclave from the following reactants: 400 parts by weight of de-ionized water, 0.45 parts by weight of the polyvinyl alcohol used in Comparison Experiment B, 0.15 parts by weight of methylcellulose MC 25 S, 2.0 parts by weight of dicetyl peroxydicarbonate, 1.0 parts by weight of dilauroyl peroxide and 200 parts by weight of styrene. The polymerization temperature was 60° C., the stirrer speed was 300 min⁻¹, (=r.p.m.) and the polymerization time was 6 hours. After the fourth batch, a firmly adhering wall deposit showed throughout the filled area and had to be dissolved out with THF. Its weight was 4.27 parts by weight.

EXAMPLE 28

With the product of Example 4 and BD, a 5% by weight ethanolic solution in the molar ratio of 6:4 was prepared, and adjusted to a pH of 12 with sodium hydroxide solution. The autoclave was coated with this solution and then heated for 2 hours at 90° C. Using the procedure of Comparison Experiment D without fresh coating between batches, four batches were polymerized and the resulting very easily removable wall deposit weighed a total of 0.18 parts by weight.

Comparison Experiment E

Comparison Experiment D was repeated except that a mixture of 100 parts by weight of each methyl methacrylate and styrene was used instead of styrene. The very firmly adhering wall deposit after four batches amounted to 1.35 parts by weight.

EXAMPLE 29

Example 28 was repeated except that a mixture of 100 parts by weight each of styrene and methyl methacrylate was used instead of styrene. After four batches, a slight, very easily removalbe wall deposit of 0.08 parts by weight was detected.

Using the procedure described after Example 12, the following three Examples were carried out:

EXAMPLE 30

The autoclave was coated before each batch with a 5% by weight solution of the product of Example 7 in an 80:20 mixture of ethanol and water with the solution having been adjusted to a pH of 12 with sodium hydroxide solution. A total of 0.09 parts by weight of wall deposit was removed.

EXAMPLE 31

With the products of Examples 4 and 7 (weight ratio 1:1) and BD, a 5% by weight solution in ethanol with 20% water was prepared of a molar ratio of the components of Examples 4 and 7: BD=5:4), and adjusted to a pH of 9.5 with 2N NaOH. The reactor was coated with this solution and was heated for 60 minutes at 90° C. After five batches without the coating being renewed in between, 0.3 parts by weight of deposit was found.

EXAMPLE 32

Example 31 was repeated except that the molar ratio of the components of Examples 4 and 7: BD was adjusted to 1:1 and the solution was adjusted to a pH of 10 with 2N sodium hydroxide solution. After being coated with this solution, the reactor was heated for 90 minutes at 85° C. After five batches without cleaning in between batches, 0.3 parts by weight of loosely adhering deposit was produced.

EXAMPLE 33

Using the procedure of Example 2, 85 g (0.78 mole) of 4-aminophenol and 21 g (0.11 mole) of 2-aminophenol-4-sulfonic acid dissolved in 800 ml of ethanol and 50 ml of 2N sodium hydroxide solution were reacted with 149.6 g (0.44 mole) of BD in 600 ml of ethanol. After eight hours at reflux, the solvent was distilled off and the product was dried under a high vacuum to obtain yield of 99%.

EXAMPLE 34

Using the procedure of Example 33, 71 g (0.65 mole) of 4-aminophenol and 31 g (0.16 mole) of 2-aminophenol-4-sulfonic acid dissolved in 800 ml of ethanol and 75 ml of 2N sodium hydroxide solution were reacted with 136.0 g (0.40 mole) of BD in 600 ml of ethanol to obtain a yield of 97.8%.

EXAMPLE 35

Using the procedure of Example 33, 61 g (0.56 mole) of 4-aminophenol and 41 g (0.22 mole) of 2-aminophenol-4-sulfonic acid dissolved in 800 ml of ethanol and 100 ml of 2N sodium hydroxide solution were reacted with 129.2 g (0.38 mole) of BD in 600 ml of ethanol to obtain a yield of 98%.

EXAMPLE 36

Using the procedure of Example 33, 51 g (0.47 mole) of 4-aminophenol and 51 g (0.27 mole) of 2-aminophenol-4-sulfonic acid dissolved in 700 ml of ethanol and 125 ml of 2N sodium hydroxide solution were reacted with 122.4 g (0.36 mole) of BD in 600 ml of ethanol to obtain a yield of 95.6%.

Various modifications of the process may be made without departing from the spirit or scope thereof and it is to be understood that the invention is intended to be limited only as defined in the appended claims.

What we claim is:

1. A polymerization reactor provided with a coating on the inner wall of the reactor and other equipment whose surfaces come into contact with the constituents of the reaction mixture that at least suppresses polymer formation, the coating being comprised of at least one compound of the formula $$R_1-X-CH_2-CH(OH)-Y$$

wherein X is selected from the group consisting of —O—, —S—, and

Y is selected from the group consisting of —CH$_2$OR$_6$

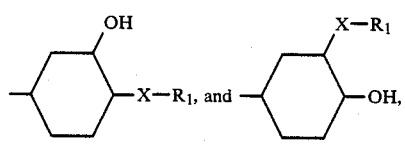

R$_1$ is selected from the group consisting of R$_2$—,

and R$_2$—SO$_2$—, R$_2$ is selected from the group consisting of phenyl optionally substituted with at least one R$_3$ and naphthyl optionally substituted with at least one R$_3$ or a heterocycle optionally substituted with at least one R$_3$ and derived by substitution of nitrogen, sulfur and/or oxygen atoms for at least one carbon of benzene, cyclopentadiene, indene, naphthylene or their partially or completely hydrogenated analogs, an alkyl of 1 to 8 carbon atoms containing at least one R$_3$,

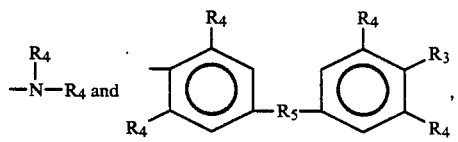

R$_3$ is selected from the group consisting of —OH, —SH,

—COOH and —SO$_3$H, the R$_4$'s being independently selected from the group consisting of hydrogen and alkyl of 1 to 4 carbon atoms, R$_5$ is selected from the group consisting of

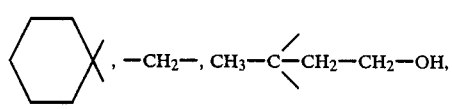

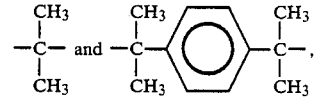

R$_6$ is selected from the group consisting of

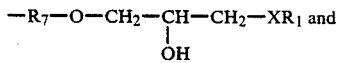

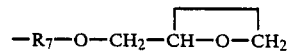

and R$_7$ is selected from the group consisting of alkylene of 1 to 8 carbon atoms optionally substituted with at least one alkyl of 1 to 4 carbon atoms, phenylene having at least one R$_3$ and/or R$_4$, naphthylene having at least one R$_3$ and/or R$_4$ and

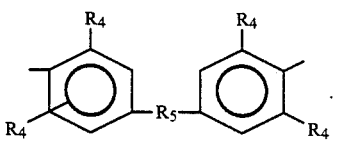

2. A polymerization reactor provided with a coating on the inner wall of the reactor that at least suppresses polymer formation, the coating being comprised of the reaction product of (A) at least one compound of the formula

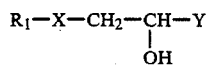     I wherein X is selected from the group consisting of —O—, —S—, and

Y is
selected from the group consisting of —CH$_2$OR$_6$,

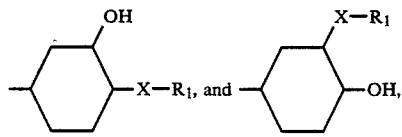

R$_1$ is selected from the group consisting of R$_2$—,

and R$_2$SO$_2$—, R$_2$ is selected from the group consisting of phenyl optionally substituted with at least one R$_3$ and naphthyl optionally substituted with at least one R$_3$ and hydrogenated analogs thereof, a heterocycle optionally substituted with at least one R$_3$ and derived by substitution of nitrogen, sulfur and/or oxygen atoms for at least one carbon of benzene, cyclopentadiene, an alkyl of 1 to 8 carbon atoms containing at least one R$_3$,

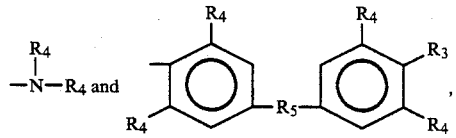

R$_3$ is selected from the group consisting of —OH, —SH,

—COOH and —SO$_3$H, the R$_4$'s being independently selected from the group consisting of hydrogen and alkyl of 1 to 4 carbon atoms, R$_5$ is selected from the group consisting of

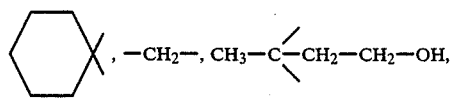

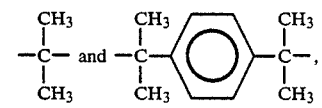

R$_6$ is selected from the group consisting of

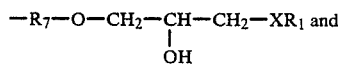

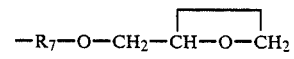

and R$_7$ is selected from the group consisting of alkylene of 1 to 8 carbon atoms optionally substituted with at least one R$_3$ and/or R$_4$, naphthylene having at least one R$_3$ and/or R$_4$ and

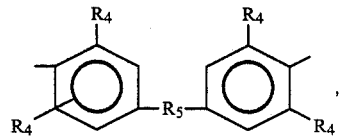

and (B) at least one compound of the formula

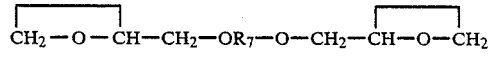

wherein R$_7$ has the above definition in a molar ratio of 10:1 to 1:1.

* * * * *